(12) United States Patent
Ho

(10) Patent No.: US 8,590,571 B2
(45) Date of Patent: Nov. 26, 2013

(54) LATCHING VALVE

(75) Inventor: Thanh Ho, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 430 days.

(21) Appl. No.: 12/841,441

(22) Filed: Jul. 22, 2010

(65) Prior Publication Data

US 2012/0017997 A1    Jan. 26, 2012

(51) Int. Cl.
*F16K 11/07* (2006.01)
*F16K 11/18* (2006.01)

(52) U.S. Cl.
USPC ............. 137/625.66; 137/625.27; 137/625.64

(58) Field of Classification Search
USPC ................. 137/625.25, 625.27, 625.5, 625.6, 137/625.65, 625.63, 596.15
See application file for complete search history.

(56) References Cited

U.S. PATENT DOCUMENTS

| | | | | |
|---|---|---|---|---|
| 2,930,404 | A | * | 3/1960 | Kowalski et al. ........ 137/625.65 |
| 3,016,917 | A | * | 1/1962 | Hunt ........................ 137/625.27 |
| 3,109,455 | A | | 11/1963 | Horowitz et al. |
| 3,403,699 | A | | 10/1968 | Fites |
| 3,584,646 | A | * | 6/1971 | Olmsted .................. 137/596.18 |
| 4,128,110 | A | * | 12/1978 | Haytayan .................. 137/454.2 |
| 4,458,645 | A | | 7/1984 | Schwartzman |
| 4,506,700 | A | | 3/1985 | Kramer |
| 4,834,141 | A | * | 5/1989 | Frisch ....................... 137/625.66 |
| 4,838,308 | A | | 6/1989 | Thomas et al. |
| RE33,246 | E | * | 7/1990 | Barree ........................ 137/625.5 |
| 5,103,866 | A | * | 4/1992 | Foster ....................... 137/596.15 |
| 5,497,806 | A | * | 3/1996 | Swank et al. ............. 137/625.65 |
| 5,918,631 | A | | 7/1999 | Weiler, Jr. et al. |
| 6,026,860 | A | | 2/2000 | Teichmann |
| 6,860,292 | B2 | | 3/2005 | Fasolino et al. |
| 6,896,002 | B2 | * | 5/2005 | Hart et al. .................. 137/625.5 |
| 7,354,118 | B2 | | 4/2008 | Herbst |
| 2007/0215223 | A1 | | 9/2007 | Morris |

OTHER PUBLICATIONS

Response to Non-Final Office Action issued Nov. 6, 2012 for related U.S. Appl. No. 12/841,545, filed Feb. 6, 2013.

* cited by examiner

*Primary Examiner* — John K Fristoe, Jr.
*Assistant Examiner* — Daphne M Barry
(74) *Attorney, Agent, or Firm* — Calfee, Halter & Griswold LLC

(57) ABSTRACT

A latching valve system includes a housing, a supply port defined in the housing, a delivery port defined in the housing, an exhaust port defined in the housing, an apply port defined in the housing, and a release port defined in the housing. The apply port is sealingly fluidly isolated from the supply port, the delivery port, and the exhaust port. The release port is sealingly fluidly isolated from the supply port, the delivery port, and the exhaust port. An apply valve supplies an apply pilot pressure to the apply port as a function of a state of the apply valve. A release valve supplies a release pilot pressure to the release port as a function of a state of the release valve. A bore, defined in the housing, fluidly communicates with the supply port, the delivery port, the exhaust port, the apply port, and the release port. A shuttle, sealingly and movably secured in the bore, is set to one of an apply position and a release position as a function of the respective apply and release pilot pressures at the apply and release ports. The delivery port fluidly communicates with the supply port while the shuttle is in the apply position. The delivery port fluidly communicates with the exhaust port while the shuttle is in the release position.

20 Claims, 2 Drawing Sheets

LATCHING VALVE

BACKGROUND

The present invention relates to a latching valve. It finds particular application in conjunction with dual piloting valves and will be described with particular reference thereto. It will be appreciated, however, that the invention is also amenable to other applications.

Some control systems for air-operated devices utilize solenoid valves that are turned on (to supply a fluid such as compressed air) and off (to exhaust the fluid such as compressed air) by electronic and/or pneumatic control switches. A "normally closed" solenoid valve remains in a closed state until an activation signal (e.g., an electronic activation signal) is received by the solenoid valve (e.g., when the solenoid valve is energized). The "normally closed" solenoid valve transitions to an open state for only as long as the activation signal is applied to the solenoid valve (e.g., as long as the solenoid valve is energized). The normally closed solenoid valve returns to the closed state when the activation signal is no longer received by the solenoid valve (e.g., when the solenoid valve is de-energized). A "normally open" solenoid valve remains in a open state until an activation signal is received by the solenoid valve (e.g., when the solenoid valve is energized). The "normally open" solenoid valve transitions to a closed state for only as long as the activation signal is applied to the solenoid valve (e.g., as long as the solenoid valve is energized). The normally open solenoid valve returns to the open state when the activation signal is no longer received by the solenoid valve (e.g., when the solenoid valve is de-energized). A latching solenoid valve remains in either the closed state or the open state until an activation signal is received (e.g., until the latching solenoid valve is energized). The latching solenoid valve switches to the other state (e.g., switches from the closed state to the open state, or vice-versa) when the activation signal is received (e.g., until the latching solenoid valve is energized), and remains in the other state until the next activation signal is received (e.g., until the latching solenoid valve is de-energized and then energized again).

Current solenoid valves use fluid (e.g., compressed air) exiting a delivery port of the solenoid valve (e.g., when the solenoid valve is in the open state) for operating air-operated devices. The flow of air through the solenoid valve is determined as a function of diameters of the respective ports (or sealing seats). In some cases, the flow of air through the solenoid valve is restricted by ports with relatively smaller diameters. Simply choosing a solenoid valve having ports with relatively larger diameters is not always practical (e.g., the overall size of the solenoid valve itself may be too large for the available space and/or cost more).

The present invention provides a new and improved apparatus and method which addresses the above-referenced problems.

SUMMARY

In one embodiment, a latching valve system includes a housing, a supply port defined in the housing, a delivery port defined in the housing, an exhaust port defined in the housing, an apply port defined in the housing, and a release port defined in the housing. The apply port is sealingly fluidly isolated from the supply port, the delivery port, and the exhaust port. The release port is sealingly fluidly isolated from the supply port, the delivery port, and the exhaust port. An apply valve supplies an apply pilot pressure to the apply port as a function of a state of the apply valve. A release valve supplies a release pilot pressure to the release port as a function of a state of the release valve. A bore, defined in the housing, fluidly communicates with the supply port, the delivery port, the exhaust port, the apply port, and the release port. A shuttle, sealingly and movably secured in the bore, is set to one of an apply position and a release position as a function of the respective apply and release pilot pressures at the apply and release ports. The delivery port fluidly communicates with the supply port while the shuttle is in the apply position. The delivery port fluidly communicates with the exhaust port while the shuttle is in the release position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
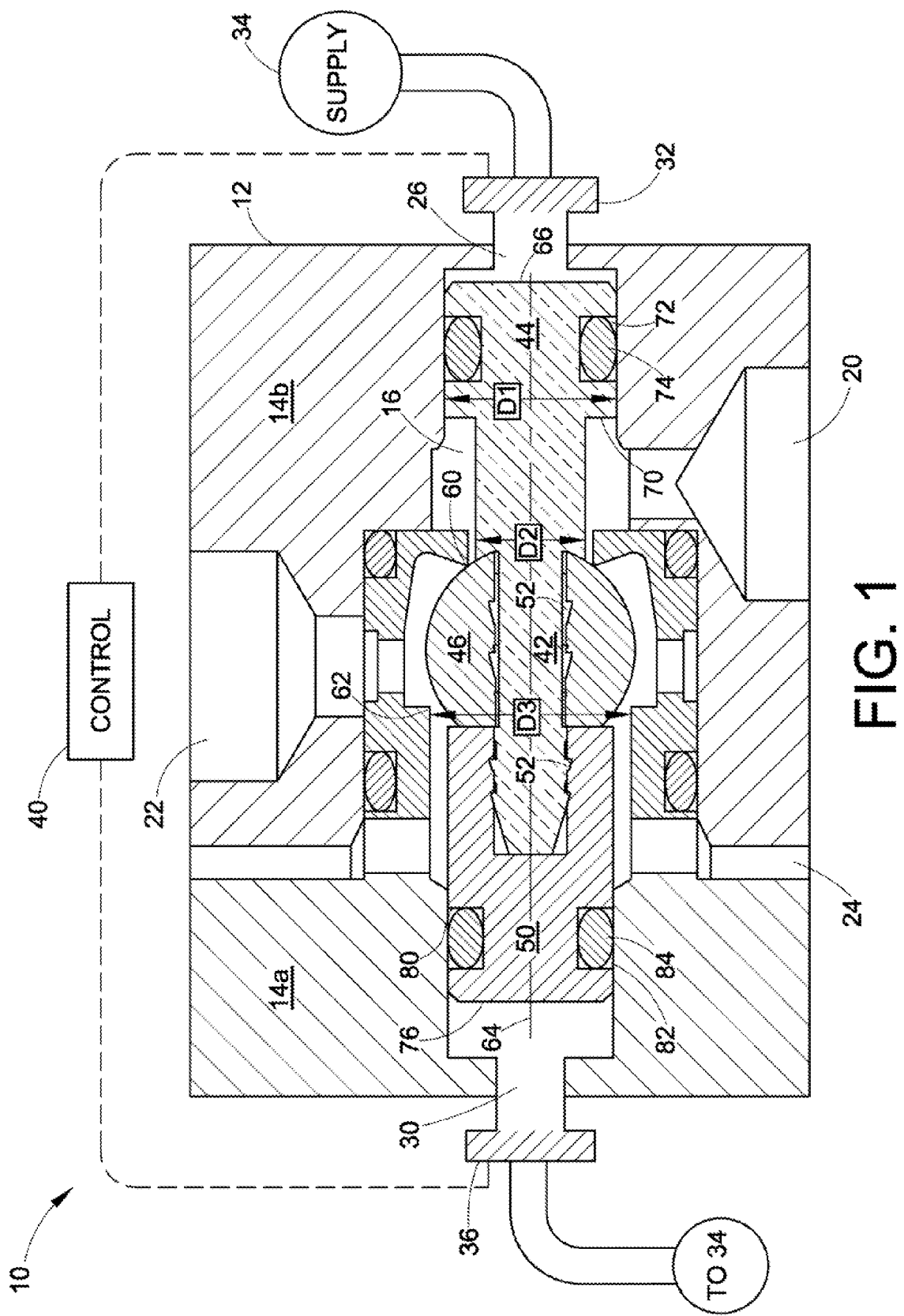
FIG. 1 illustrates a schematic representation of a latching valve system in a release state in accordance with one embodiment of an apparatus illustrating principles of the present invention.
Figure 2:
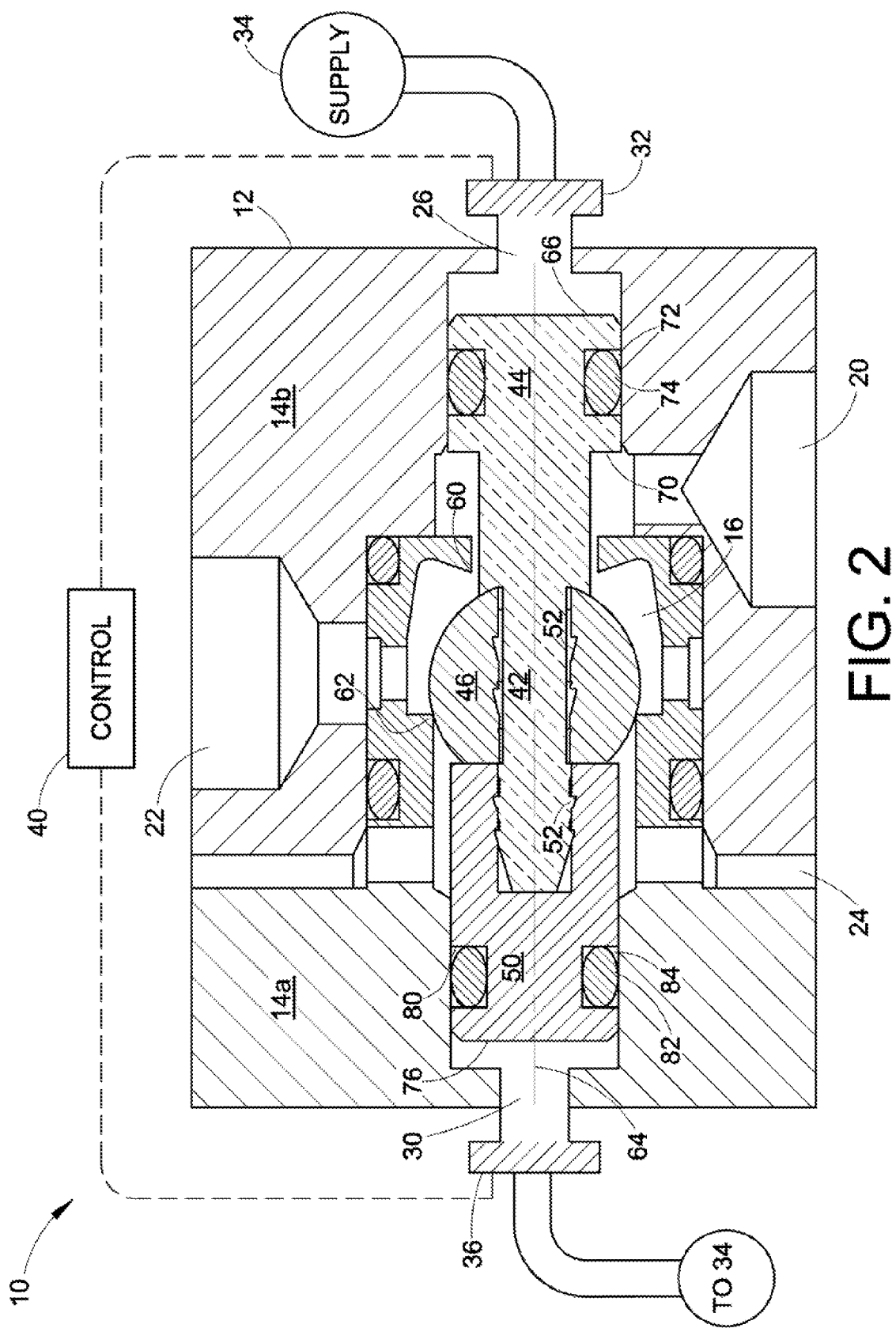
FIG. 2 illustrates a schematic representation of a latching valve system in an apply state in accordance with one embodiment of an apparatus illustrating principles of the present invention.

With reference to FIGS. 1 and 2, simplified component diagrams of an exemplary latching valve system 10 are illustrated a release position and in an apply position, respectively, in accordance with one embodiment of the present invention. The latching valve system includes a latching valve 12, which includes a housing 14 comprised of multiple parts. For example, the illustrated embodiment shows the housing 14 comprised of two (2) parts 14a, 14b.

A bore 16 is defined within the housing 14. In addition, various ports are defined in the housing 14. For example, a supply port 20, a delivery port 22, and an exhaust port 24 are defined to extend through a wall of the housing 14. The supply port 20 fluidly communicates with a supply of compressed air and the bore 16. The delivery port 22 fluidly communicates with a device operated by compressed air (e.g., a vehicle brake operated by compressed air) and the bore 16. The exhaust port 24 fluidly communicates with atmosphere and the bore 16. An apply port 26 and a release port 30 are also defined to extend through a wall of the housing 14.

An apply valve 32 (e.g., a solenoid valve or a pneumatic valve) is fluidly connected to the apply port 26 and a source of pressurized fluid (e.g., air) 34. Although it is not illustrated, it is to be understood that the supply port 20 may also be fluidly connected to the source 34 of pressurized air; alternatively the supply port 20 may also be fluidly connected to another source of pressurized air (e.g., a source of pressurized air different than the source 34). The apply valve 32 controls application of an apply pilot pressure to the apply port 26. Therefore, the apply port 26 fluidly communicates with the bore 16 and the apply valve 32. A release valve 36 (e.g., a solenoid valve or a pneumatic valve) is fluidly connected to the release port 30 and the source 34 of pressurized air. The release valve 36 controls application of a release pilot pressure to the release port 30. Therefore, the release port 30 fluidly communicates with the bore 16 and the release valve 36. It is to be understood that one or both of the apply and release valves 32, 36, respectively, described below may be either solenoid valve(s) or pneumatic valve(s).

A control mechanism 40 independently controls operation of the apply and release valves 32, 36, respectively. It is contemplated that the control mechanism 40 is an electronic control mechanism that electronically controls the valves 32, 36. However, other types of control mechanisms (e.g., pneumatic) are also contemplated. In one embodiment, each of the valves 32, 36 operates in two (2) different modes or states (e.g., a closed state and an open state). In the closed state, the valves 32, 36 prevent the source of pressurized air 34 from fluidly communicating with the apply port and the release port 26, 30, respectively; therefore, when the valves 32, 36 are in the closed state, the apply port 26 and the release port 30 are at atmosphere. In the open state, the apply port and the release port 26, 30, respectively, fluidly communicate with the source of pressurized air 34 via the respective valves 32, 36; therefore, when the valves 32, 36 are in the open state, the respective pressures at the apply port 26 and the release port 30 are at the apply pilot pressure and the release pilot pressure (e.g., the apply port 26 and the release port 30 are at the pressure of the source 34).

In one embodiment, it is contemplated that the valves 32, 36 are "normally closed" valves. Therefore, the apply valve 32 remains closed unless and until the control mechanism 40 transmits an apply activation signal to the apply valve 32, which energizes the apply valve 32. Upon receiving the apply activation signal from the control mechanism 40 (e.g., when the apply valve 32 is energized), the apply valve 32 opens, and remains open, until the apply activation signal is no longer received from the control mechanism 40 (e.g., until the apply valve 32 is de-energized). In other words, the apply valve 32 is only in the open state as long as the apply activation signal is received from the control mechanism 40; and the apply valve 32 returns to the closed state after the apply activation signal is no longer received from the control mechanism 40 (the apply valve 32 is de-energized). The release valve 36 operates in a similar manner. Although it has been described that the both the apply and release valves 32, 36, respectively, are normally closed, it is to be understood that one or both of the valves may be of another type (e.g., normally open, etc). In addition, other types of valves (e.g., spring biased valves) are also contemplated instead of, or in addition to, the valves discussed above.

A shuttle mechanism 42 is movably and sealingly secured in the bore 16. The shuttle mechanism 42 includes an apply piston 44, a sealing member 46, and a release piston 50. In the illustrated embodiment, the apply piston 44, the sealing member 46, and the release piston 50 move together as a single unit within the bore 16. For example, it is contemplated that the apply piston 44 includes barbs 52 that are used to secure the apply piston 44 to the sealing member 46 and the release piston 50 via an interference fit.

An inlet seat 60 and an exhaust seat 62 are in the bore 16. In one embodiment, the sealing member 46 is a rubber material, while the inlet seat 60, and the exhaust seat 62 are a plastic material. As illustrated in FIGS. 1 and 2, the bore 16 is defined by different diameters at various positions along an axis 64 of the bore 16 between the release port 30 and the apply port 26. For example, the diameter of the bore 16 at the apply piston 44 is D1, the diameter of the bore 16 at the inlet seat 60 is D2, and the diameter of the bore 16 at the exhaust seat 62 is D3. It is contemplated that a ratio of the diameter D1 of the bore 16 at the apply piston 44 to the diameter D2 of the bore 16 at the inlet seat 60 (e.g., D1/D2) is greater than about 1.0, and that a ratio of the diameter D3 of the bore 16 at the exhaust seat 62 to the diameter D1 of the bore 16 at the apply piston 44 (e.g., D3/D1) is also greater than about 1.0. In one embodiment, the ratio of the diameter D1 to the diameter D2 (e.g., D1/D2) is about 1.4 to about 1.5, and the ratio of the diameter D3 to the diameter D1 (e.g., D3/D1) is about 1.1 to about 1.4.

In the illustrated embodiment, the sealing member 46 is rounded (e.g., a ball seal) and is positioned in the bore 16 between the inlet seat 60 and the exhaust seat 62. As discussed in more detail below, the shuttle mechanism 42 sealingly moves between two (2) positions in the bore 16 as a function of the respective pilot pressures at the apply and release ports 26, 30.

As illustrated, the apply piston 44 includes a first (external) face 66 and a second (internal) face 70. The first (external) face 66 of the apply piston 44 is in fluid communication with the apply port 26. A recess 72 is on the apply piston 44 between the first and second faces 66, 70, respectively. An apply piston seal 74 (e.g., an o-ring) is positioned in the apply piston recess 72 to create a seal between the wall of the bore 16 and the apply piston 44. The apply piston seal 74 maintains the seal between the wall of the bore 16 and the apply piston 44 as the apply piston 44 moves in the bore 16. The apply piston seal 74 maintains the apply port 26 (and the first (external) face 66 of the apply piston 44) as fluidly independent of the supply port 20, the delivery port 22, and the exhaust port 24.

The release piston 50 includes a first (external) face 76 and a second (internal) face 80. The first (external) face 76 of the release piston 50 is in fluid communication with the release port 30. A recess 82 is on the release piston 50 between the first and second faces 76, 80, respectively. A release piston seal 84 (e.g., an o-ring) is positioned in the release piston recess 82 to create a seal between the wall of the bore 16 and the release piston 50. The release piston seal 84 maintains the seal between the wall of the bore 16 and the release piston 50 as the release piston 50 moves in the bore 16. The release piston seal 84 maintains the release port 30 (and the first (external) face 76 of the release piston 50) as fluidly independent of the supply port 20, the delivery port 22, and the exhaust port 24.

The supply port 20 is positioned between the inlet seat 60 and the second (internal) face 70 of the apply piston 44. The delivery port 22 is positioned between the inlet seat 60 and the exhaust seat 62. The exhaust port 24 is positioned between the second face 80 of the release piston 50 and the exhaust seat 62.

As mentioned above, the shuttle mechanism 42 sealingly moves between two (2) positions in the bore 16 as a function of the apply pilot pressure at the apply port 26 and the release pilot pressure at the release port 30. For example, the shuttle mechanism 42 sealingly moves in the bore 16 to be set to either a release position (as illustrated in FIG. 1) or an apply position (as illustrated in FIG. 2).

When the shuttle mechanism 42 is in the release position (FIG. 1), the apply piston 44, the sealing member 46, and the release piston 50 (e.g., the shuttle mechanism 42) are positioned relatively toward the right side of the bore 16 (e.g., toward the end of the bore 16 including the apply port 26). When the shuttle mechanism 42 is in the release position, the sealing member 46 sealingly engages the inlet seat 60; at the same time, the sealing member 46 does not sealingly engage the exhaust seat 62. Because the sealing member 46 sealingly engages the inlet seat 60 (while not sealingly engaging the exhaust seat 62), the delivery port 22 fluidly communicates with the exhaust port 24 via the bore 16. At the same time, the delivery port 22 does not fluidly communicate with the supply port 20 because the sealing member 46 is sealingly engaging the inlet seat 60.

When the delivery port 22 fluidly communicates with the exhaust port 24 via the bore 16, any compressed air at the delivery port 22 travels through the bore 16 and around the shuttle mechanism 42 before exiting the valve 12 via the exhaust port 24. Since the apply and release valves 32, 36, respectively, are fluidly independent of the delivery and exhaust ports 22, 24, respectively, the compressed air from the delivery port 22 does not travel through the valves 32, 36 before exiting the valve 12 via the exhaust port 24.

With the shuttle mechanism in the release position, compressed fluid (e.g., air) at the supply port 20 (e.g., the supply pressure) acts on the sealing member 46, which is sealed against the inlet seat 60. The compressed air at the supply port 20 (the supply pressure) also acts on the second (internal) face 70 of the apply piston 44. Because the diameter of the bore 16 at the apply piston 44 is larger than the diameter of the bore 16 at the inlet seat 60, the supply pressure acts to urge the shuttle mechanism 42 toward the right side of the bore 16 (e.g., toward the apply port 26) and maintain a seal between the sealing member 46 and the inlet seat 60. Therefore, once the shuttle mechanism 42 is in the release position, the supply pressure at the supply port 20 acts to maintain the shuttle mechanism 42 in the release position within the bore 16 even if the release pilot pressure at the release port 30 is removed (while no apply pilot pressure is present at the apply port 26).

When the shuttle mechanism 42 is in the apply position (FIG. 2), the apply piston 44, the sealing member 46, and the release piston 50 (e.g., the shuttle mechanism 42) are positioned relatively toward the left side of the bore 16 (e.g., toward the end of the bore 16 including the release port 30). When the shuttle mechanism 42 is in the release position, the sealing member 46 sealingly engages the exhaust seat 62; at the same time, the sealing member 46 does not sealingly engage the inlet seat 60. Because the sealing member 46 sealingly engages the exhaust seat 62 (while not sealingly engaging the inlet seat 60), the delivery port 22 fluidly communicates with the supply port 20 via the bore 16. At the same time, the delivery port 22 does not fluidly communicate with the exhaust port 24 because the sealing member 46 is sealingly engaging the exhaust seat 62.

When the delivery port 22 fluidly communicates with the supply port 20 via the bore 16, the compressed air at the supply port 20 travels through the bore 16 and around the shuttle mechanism 42 before exiting the valve 12 via the delivery port 22. Since the apply and release valves 32, 36, respectively, are fluidly independent of the delivery and supply ports 22, 20, respectively, the compressed air from the supply port 20 does not travel through the valves 32, 36 before exiting the valve 12 via the delivery port 22.

With the shuttle mechanism 42 in the apply position, the supply pressure at the supply port 20 acts on the sealing member 46, which is sealed against the exhaust seat 62. The supply pressure at the supply port 20 also acts on the second (internal) face 70 of the apply piston 44. Because the diameter of the bore 16 at the exhaust seat 62 is larger than the diameter of the bore 16 at the apply piston 44, the supply pressure acts to urge the shuttle mechanism 42 toward the left side of the bore 16 (e.g., toward the release port 30) and maintain a seal between the sealing member 46 and the exhaust seat 62. Therefore, once the shuttle mechanism 42 is in the apply position, the supply pressure at the supply port 20 acts to maintain the shuttle mechanism 42 in the apply position within the bore 16 even if the apply pilot pressure at the apply port 26 is removed (while no release pilot pressure is present at the release port 30).

During use, when it is desired to release pressure at the delivery port 22 (e.g., make the delivery port 22 fluidly communicate with the exhaust port 24 so that exhaust (atmospheric) pressure is present at the delivery port 22), the control mechanism 40 does not apply an activation signal to the apply valve 32 to ensure that the apply valve 32 is in the closed state (e.g., the apply valve 32 is not energized). By ensuring the apply valve 32 is in the closed state, it is ensured that an apply pilot pressure is simultaneously not applied at the apply port 26 and against the first (external) face 66 of the apply piston 44. The control mechanism 40 then applies an activation signal to the release valve 36 (e.g., the release valve 36 is energized) to cause the release valve 36 to change from the closed state to the open state. While in the open state, the release valve 36 passes compressed fluid from the source 34 to the release port 30 so that the release pilot pressure is present at the release port 30. Since the release pilot pressure is present at the release port 30, and the apply pilot pressure is not present at the apply port 26, the shuttle mechanism 42 is set to the release position (see FIG. 1). More specifically, if the shuttle mechanism 42 is already in the release position, the shuttle mechanism 42 remains in the release position. On the other hand, if the shuttle mechanism 42 is in the apply position, the shuttle mechanism 42 is shifted from the apply position (FIG. 2) to the release position (FIG. 1).

Once the shuttle mechanism 42 is in the release position, the control mechanism 40 no longer transmits the activation signal to the release valve 36 (e.g., the release valve 36 is de-energized), which causes the release valve 36 to switch from the open state to the closed state. At this point, both the release valve 36 and the apply valve 32 are in the closed (e.g., de-energized) state. With both valves 36, 32 in the closed state, neither the release pilot pressure nor the apply pilot pressure is present at the release port 30 or the apply port 26, respectively. Therefore, as described in more detail above, the supply pressure at the supply port 20 acts to maintain the shuttle mechanism 42 in the release position within the bore 16. In this manner, the shuttle mechanism 42 is "latched" in the release position.

In the embodiment discussed above, the control mechanism 40 stops transmitting the activation signal to the release valve 36 (e.g., the release valve 36 is de-energized) once the shuttle mechanism 42 is in the release position. However, other embodiments are also contemplated in which the control mechanism 40 continues transmitting the activation signal to the release valve 36 (e.g., the release valve 36 remains energized) even after the shuttle mechanism 42 is in the release position. In these other embodiments, the shuttle mechanism 42 remains in the release position while the activation signal is transmitted to the release valve 36 (e.g., while the release valve 36 is energized), regardless of whether an activation signal is transmitted to the apply valve 32 (regardless of whether the apply valve 32 is energized). In other words, if respective activation signals are transmitted to both the release valve 36 and the apply valve 32 (e.g., if both the release valve 36 and the apply valve 32 are energized), the shuttle mechanism 42 remains in the current position (e.g., in this case, the shuttle mechanism 42 remains in the release position).

When it is desired to build pressure at the delivery port 22 (e.g., make the delivery port 22 fluidly communicate with the supply port 20 so that supply pressure is present at the delivery port 22), the control mechanism 40 does not apply an activation signal to the release valve 36 to ensure that the release valve 36 is in the closed state. By ensuring the release valve 36 is in the closed state, it is ensured that a release pilot pressure is simultaneously not applied at the release port 30 and against the first (external) face 76 of the release piston 50. The control mechanism 40 then applies an activation signal to the apply valve 32 to cause the apply valve 32 to change from the closed state to the open state. While in the open state, the apply valve 32 passes compressed fluid from the source 34 to the apply port 26 so that the apply pilot pressure is present at the apply port 26. Since the apply pilot pressure is present at the apply port 26, and the release pilot pressure is not present at the release port 30, the shuttle mechanism 42 is set to the apply position (see FIG. 2). More specifically, if the shuttle mechanism 42 is already in the apply position, the shuttle mechanism 42 remains in the apply position. On the other hand, if the shuttle mechanism 42 is in the release position, the shuttle mechanism 42 is shifted from the release position (FIG. 1) to the apply position (FIG. 2).

Once the shuttle mechanism 42 is in the apply position, the control mechanism 40 no longer transmits the activation signal to the apply valve 32, which causes the apply valve 32 to switch from the open state to the closed state. At this point, both the apply valve 32 and the release valve 36 are in the closed state. With both valves 32, 36 in the closed state, neither the apply pilot pressure nor the release pilot pressure is present at the apply port 26 or the release port 30, respectively. Therefore, as described in more detail above, the supply pressure at the supply port 20 acts to maintain the shuttle mechanism 42 in the apply position within the bore 16. In this manner, the shuttle mechanism 42 is "latched" in the apply position.

In the embodiment discussed above, the control mechanism 40 stops transmitting the activation signal to the apply valve 32 once the shuttle mechanism 42 is in the apply position. However, other embodiments are also contemplated in which the control mechanism 40 continues transmitting the activation signal to the apply valve 32 even after the shuttle mechanism 42 is in the apply position. In these other embodiments, the shuttle mechanism 42 remains in the apply position while the activation signal is transmitted to the apply valve 32, regardless of whether an activation signal is transmitted to the release valve 36. As noted above, if respective activation signals are transmitted to both the apply valve 32 and the release valve 36, the shuttle mechanism 42 remains in the current position (e.g., in this case, the shuttle mechanism 42 remains in the apply position).

From the discussions above, it is noted that the latching valve 12 switches the shuttle mechanism 42 between the apply and release positions, and latches the shuttle mechanism 42 in the respective position, without the use of springs. As discussed above, the supply pressure, which is present at the supply port 20, is used for latching the shuttle mechanism 42 in the respective position.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A latching valve, comprising:
a housing;
a supply port defined in the housing;
a delivery port defined in the housing;
an exhaust port defined in the housing;
an apply port defined in the housing, the apply port being sealingly fluidly isolated from the supply port, the delivery port, and the exhaust port;
an apply piston having a face in fluid communication with the apply port;
a release port defined in the housing, the release port being sealingly fluidly isolated from the supply port, the delivery port, and the exhaust port;
a release piston having a face in fluid communication with the release port;
a bore defined in the housing, the supply port, the delivery port, the exhaust port, the apply port, and the release port fluidly communicating with the bore;
an inlet seat in the bore;
an exhaust seat in the bore; and
a shuttle, sealingly and movably secured in the bore, set to one of an apply position and a release position as a function of respective pilot pressures at the apply and release ports, the delivery port fluidly communicating with the supply port while the shuttle is in the apply position, and the delivery port fluidly communicating with the exhaust port while the shuttle is in the release position, the shuttle including:
a sealing member movably positioned between the inlet seat and the exhaust seat, the sealing member sealingly engaging the exhaust seat while the shuttle is in the apply position, the sealing member sealingly engaging the inlet seat while the shuttle is in the release position, and while the shuttle is in the release position, a difference in bore diameters at the inlet seat and the apply piston causes a pressure at the supply port to maintain the seal between the sealing member and the inlet seat.

2. The latching valve as set forth in claim 1, wherein:
the fluid communication between the delivery port and the supply port, while the shuttle is in the apply position, is via the bore and around the shuttle; and
the fluid communication between the delivery port and the exhaust port, while the shuttle is in the release position, is via the bore and around the shuttle.

3. The latching valve as set forth in claim 1, wherein the apply piston, the release piston, and the sealing member move together as a single unit.

4. The latching valve as set forth in claim 3, wherein:
the apply piston, the release piston, and the sealing member are secured together so the apply piston, the release piston, and the sealing member do not move relative to each other.

5. The latching valve as set forth in claim 4, wherein:
the release piston and the sealing member are secured to the apply piston via respective interference fits.

6. The latching valve as set forth in claim 1, wherein:
a ratio of the bore diameter at the apply piston to the bore diameter at the inlet seat is greater than about 1.0.

7. The latching valve as set forth in claim 1, wherein:
while the shuttle is in the apply position, a difference in bore diameters at the exhaust seat and the apply piston causes a pressure at the supply port to maintain the seal between the sealing member and the exhaust seat.

8. The latching valve as set forth in claim 7, wherein:
a ratio of the bore diameter at the exhaust seat to the bore diameter at the apply piston is greater than about 1.0.

9. The latching valve as set forth in claim 1, wherein:
the shuttle is set to the apply position when the apply pilot pressure is applied to the apply port and no pilot pressure is applied to the release port; and
the shuttle is set to the release position when the release pilot pressure is applied to the release port and no pilot pressure is applied to the apply port.

10. The latching valve as set forth in claim 1, wherein:
the shuttle remains set to one of the apply position and the release position when the respective pilot pressures are applied to both the apply port and the release port.

11. A latching valve system, comprising:
a housing;
a supply port defined in the housing;
a delivery port defined in the housing;
an exhaust port defined in the housing;
an apply port defined in the housing, the apply port always being sealingly fluidly independent of the supply port, the delivery port, and the exhaust port;
an apply valve supplying an apply pilot pressure to the apply port as a function of a state of the apply valve;
a release port defined in the housing, the release port always being sealingly fluidly independent of the supply port, the delivery port, and the exhaust port;
a release valve supplying a release pilot pressure to the release port as a function of a state of the release valve;
a bore, defined in the housing, fluidly communicating with the supply port, the delivery port, the exhaust port, the apply port, and the release port; and
a shuttle, sealingly and movably secured in the bore, set to one of an apply position and a release position as a function of the respective apply and release pilot pressures at the apply and release ports, the delivery port fluidly communicating with the supply port while the shuttle is in the apply position, and the delivery port fluidly communicating with the exhaust port while the shuttle is in the release position.

12. The latching valve system as set forth in claim 11, wherein:
after the apply valve supplies the apply pilot pressure, the shuttle remains set to the apply position even after the apply pilot pressure is no longer supplied.

13. The latching valve system as set forth in claim 12, wherein:
after the apply valve supplies the apply pilot pressure, the shuttle remains set to the apply position until the apply valve exhausts the apply pilot pressure and the release valve supplies the release pilot pressure.

14. The latching valve system as set forth in claim 11, wherein:
the apply and release valves are respectively energized to supply the apply pressure and the release pressure; and
the apply and release valves are respectively de-energized to exhaust the apply pressure and the release pressure.

15. The latching valve system as set forth in claim 11, wherein:
an inlet seat is in the bore;
an exhaust seat is in the bore;
the shuttle includes:
an apply piston having a face in fluid communication with the apply port;
a release piston having a face in fluid communication with the release port; and
a sealing member movably positioned between the inlet seat and the exhaust seat, the apply piston, the release piston, and the sealing member moving together as a single unit;
the sealing member sealingly engages the exhaust seat while the shuttle is in the apply position; and
the sealing member sealingly engages the inlet seat while the shuttle is in the release position.

16. A method of controlling a latching valve system, comprising:
determining whether one of a delivery pressure and an exhaust pressure is desired at a delivery port;
if the exhaust pressure is desired at the delivery port:
ensuring an apply pilot pressure is simultaneously not supplied at an apply port and against a face of an apply piston in fluid communication with the apply port;
after the ensuring the apply pilot pressure is not supplied, applying a release pilot pressure at a release port and against a face of a release piston to move the release piston, a sealing member, and the apply piston together as a single unit in a bore so that the single unit is in a release position in the bore and the sealing member seals against an inlet seat in the bore;
creating a fluid communication path between the delivery port and an exhaust port, with the single unit in the path of the fluid communication between the delivery port and the exhaust port when the single unit is in the release position, the path of fluid communication between the delivery port and the exhaust port being sealingly independent of the apply port and the release port;
once the single unit is in the release position in the bore, removing the release pilot pressure from the release port; and
supplying a supply pressure at a supply port for acting on the apply piston and the sealing member to maintain the single unit in the release position; and
if the delivery pressure is desired at the delivery port:
ensuring a release pilot pressure is simultaneously not supplied at the release port and against the face of the release piston in fluid communication with the release port;
after the ensuring the release pilot pressure is not supplied, applying the apply pilot pressure at the apply port and against the face of the apply piston to move the single unit in the bore so that the single unit is in an apply position in the bore and the sealing member seals against an exhaust seat in the bore;
creating a fluid communication path between the delivery port and the supply port, with the single unit in the path of the fluid communication between the delivery port and the supply port when the single unit is in the apply position, the path of fluid communication between the delivery port and the supply port being sealingly independent of the apply port and the release port;
once the single unit is in the apply position in the bore, removing the apply pilot pressure from the apply port; and
supplying the supply pressure at the supply port for acting on the apply piston and the sealing member to maintain the single unit in the apply position.

17. The method of controlling a latching valve system as set forth in claim 16, wherein:
  if the exhaust pressure is desired at the delivery port:
    the step of ensuring the apply pilot pressure is simultaneously not supplied at the apply port and against the face of an apply piston includes: de-energizing an apply valve;
    the step of applying the release pilot pressure at the release port includes: energizing a release valve associated with the release port; and
    the step of removing the release pilot pressure from the release port includes: de-energizing the release valve; and
  if the delivery pressure is desired at the delivery port:
    the step of ensuring the release pilot pressure is simultaneously not supplied at the release port and against the face of the release piston includes: de-energizing the release valve;
    the step of applying the apply pilot pressure at the apply port and against the face of the apply piston includes: energizing the apply valve; and
    the step of removing the apply pilot pressure from the apply port includes: de-energizing the apply valve.

18. A latching valve system, comprising:
  a housing;
  a supply port defined in the housing;
  a delivery port defined in the housing;
  an exhaust port defined in the housing;
  an apply port defined in the housing, the apply port being sealingly fluidly isolated from the supply port, the delivery port, and the exhaust port;
  an apply valve supplying an apply pilot pressure to the apply port as a function of a state of the apply valve;
  a release port defined in the housing, the release port being sealingly fluidly isolated from the supply port, the delivery port, and the exhaust port;
  a release valve supplying a release pilot pressure to the release port as a function of a state of the release valve;
  a bore, defined in the housing, fluidly communicating with the supply port, the delivery port, the exhaust port, the apply port, and the release port; and
  a shuttle, sealingly and movably secured in the bore, set to one of an apply position and a release position as a function of the respective apply and release pilot pressures at the apply and release ports, the delivery port fluidly communicating with the supply port while the shuttle is in the apply position, and the delivery port fluidly communicating with the exhaust port while the shuttle is in the release position.

19. The latching valve system as set forth in claim 18, wherein:
  at least one of the supply valve and release valve is a pneumatic valve.

20. The latching valve system as set forth in claim 18, wherein:
  at least one of the supply valve and release valve is a solenoid valve.

* * * * *